C. H. PETERSON.
CHAIN TIGHTENER.
APPLICATION FILED MAR. 6, 1909.
934,348.
Patented Sept. 14, 1909.
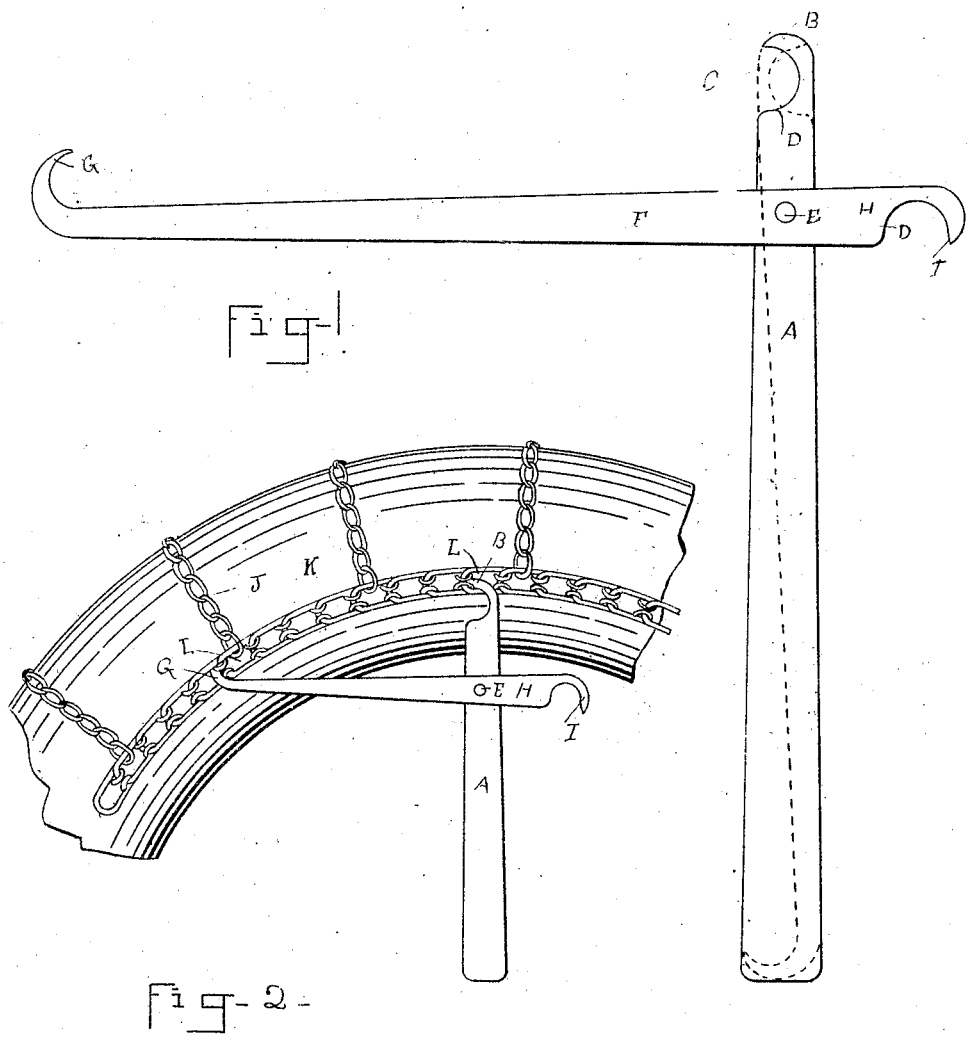

UNITED STATES PATENT OFFICE.

CHARLES H. PETERSON, OF WESTBROOK, MAINE.

CHAIN-TIGHTENER.

934,348. Specification of Letters Patent. Patented Sept. 14, 1909.

Application filed March 6, 1909. Serial No. 481,771.

*To all whom it may concern:*

Be it known that I, CHARLES H. PETERSON, a citizen of the United States, residing at Westbrook, in the county of Cumberland and State of Maine, have invented new and useful Improvements in Chain-Tighteners, of which the following is a specification.

My invention relates to improvements in chain tighteners and more particularly to a device especially adapted to tighten the anti-skid chains used on automobiles.

Its object is to provide a simple, inexpensive device adapted to easily and quickly tighten the chains and which, when not in use, can be folded up so that the hooks on the ends are protected.

It also relates to certain details of construction hereinafter described and more fully claimed.

In the drawings herewith accompanying and making part of this application, Figure 1 is a plan view of my improved tightener and Fig. 2 is a similar view showing its application.

In said drawings A represents one of the members provided with a hook B on the end thereof formed preferably by making a side recess C therein forming a holding shoulder D to prevent the chain slipping when the draw on the chain falls inside the pivot pin. Pivotally attached to the member A at a point E intermediate its ends is another member F having on one end a hook G. It may also have its other end H extending beyond the pivot so that when the device is shut up, it covers the hook B and if desired, it may be provided with a coöperating hook I. The two members are pivoted side by side and when shut up lie in the same plane in such way that all the hooks are protected as shown by dotted lines in Fig. 1.

The operation of my improved chain tightener is illustrated in Fig. 2 in which is shown the usual anti-skid chain J and a rubber tire K. The hooks B and G are inserted in the links L at some distance apart. The free end of the member A is then used as a lever to draw the ends of the chain together, the members pivoting on the pivot bar E, the position of the pivot relative to the hooks affording a long reach when necessary. Again when it is only necessary to make a short draw, the members A and F are turned so that the hooks I and B project toward each other when these hooks may be used. When not in use the tool can be folded into the position shown in dotted lines in Fig. 1.

The advantages of my improved tightener are that it is simple, inexpensive, combining in a single tool means for tightening the chain a greater or less amount as desired and when not in use can be conveniently folded so as to occupy the least possible space in the tool box and offering no sharp points to injure the tool box or its contents.

Having thus described my invention and its use I claim:—

1. In a chain tightener, two members pivoted together intermediate the ends of one of them, the adjacent sides being parallel throughout their entire extent, one provided with a hook on its free end and the other with a coöperating hook, whereby either member being stationary the other member may have a complete rotation on its pivot, the hooks being adapted when the two members are shut together to lie wholly within the peripheral lines of the other member.

2. In a chain tightener, two members pivoted together intermediate the ends of one of them, one provided with a hook on its free end and the other with a hook on each end, the two members adapted to shut one over the other, either of said hooks being adapted to coöperate with the hook on the first named member.

3. In a chain tightener, two members pivoted together intermediate their ends, one provided with a hook on its end, and the other provided with hooks on either end extending in opposite directions.

In testimony whereof, I have signed my name to this specification in presence of two subscribing witnesses this twenty-seventh day of February, 1909.

CHARLES H. PETERSON.

In presence of—
ELGIN C. VERRILL,
MARION RICHARDS.